United States Patent [19]

Brichta et al.

[11] Patent Number: 5,790,780
[45] Date of Patent: Aug. 4, 1998

[54] ANALYSIS OF FAILURES IN A COMPUTING ENVIRONMENT

[75] Inventors: Harriet E. Brichta, Plano; Connie K. Stanley, McKinney; Geoffrey J. Gerling, Celina; Henry E. Schurig, III, Frisco, all of Tex.; David M. Byers, Camp Hill; Mitchell G. Wells, Mechanicsburg, both of Pa.

[73] Assignee: Electronic Data Systems Corporation, Plano, Tex.

[21] Appl. No.: 682,974

[22] Filed: Jul. 16, 1996

[51] Int. Cl.⁶ ................................................. G01F 11/00
[52] U.S. Cl. .................... 395/183.22; 395/183.16; 395/184.01; 395/185.1
[58] Field of Search .................... 395/183.22, 183.01, 395/183.1, 183.02, 334, 333, 183.16, 184.01, 185.01, 185.1, 68, 77; 705/22, 23, 28, 29

[56] References Cited

U.S. PATENT DOCUMENTS

| | | | |
|---|---|---|---|
| 4,334,270 | 6/1982 | Towers | 364/200 |
| 5,001,714 | 3/1991 | Stark et al. | 364/580 |
| 5,090,014 | 2/1992 | Polich et al. | 395/183.02 |
| 5,159,597 | 10/1992 | Monahan et al. | 371/7 |
| 5,189,608 | 2/1993 | Lyons et al. | 364/408 |
| 5,237,677 | 8/1993 | Hirosawa et al. | 395/183.22 |
| 5,337,320 | 8/1994 | Kung | 395/917 |
| 5,420,978 | 5/1995 | Tozawa et al. | 395/334 |
| 5,448,722 | 9/1995 | Lynne et al. | 395/183.12 |
| 5,463,768 | 10/1995 | Cuddihy et al. | 395/183.13 |
| 5,579,231 | 11/1996 | Sudou et al. | 395/919 |
| 5,592,603 | 1/1997 | Arato et al. | 395/334 |
| 5,712,989 | 1/1998 | Johnson et al. | 395/228 |

*Primary Examiner*—Joseph Palys
*Attorney, Agent, or Firm*—L. Joy Griebenow

[57] ABSTRACT

A system (10) is provided for analyzing failures arising in computing environments. The system (10) includes an interface (12) which receives information relating to a current failure in a computing environment. A database (18) stores information relating to at least one prior failure in the same computing environment or another computing environment. A processor (22), which is coupled to the interface (12) and the database (18), compares the received information relating to the current failure with the stored information relating to the prior failure in order to find similarities. The processor (22) may then instruct a user to take appropriate action in response to similarities between the current failure and the prior failure, thereby analyzing the failures.

17 Claims, 5 Drawing Sheets

FIG. 3

FAILURE REPORTING SYSTEM

Please enter the information below and then press an action key at the bottom of the panel Complex: [Site 7] ~56
Vendor: [X Y Z Corp.] ~58
Item: [Work Station] ~60
Model No: [S917GH] ~62
Serial No: [9234915] ~64

Date: [3/24/96] ~66
Trouble Ticket No: [0] ~68
Defective Part: [Power Supply] ~70
Unscheduled IPL: [0] ~72 (0=No; 1=Yes)
Loss of Data: [0] ~74 (0=No; 1=Yes)

Cause of Failure:
Vendor HDW: [0] ~76 (0=No; 1=Yes)
Vendor SFW: [0] ~78 (0=No; 1=Yes)
Non-Vendor: [0] ~80 (0=No; 1=Yes)

Device Down Time (Min): [0] ~82
IS Down Time (Min): [0] ~84
Vendor Response Time (Min): [0] ~86
Repair Time (Min): [20] ~88

Additional Notes: ~90

[Insert Record] ~92  [Clear Screen] ~94  [Exit] ~96

FIG. 4

FAILURE REPORT

Model: S917GH  Vendor: X Y Z Corp.  Item: Work Station
From: 4/3/95  To: 5/1/96

| Serial No: | Date | Unscheduled IPL | Loss of Data | IS Downtime | Device Downtime | Repair Time | Vendor Response Time | PART |
|---|---|---|---|---|---|---|---|---|
| 9234915 | 5/12/95 | 0 | 1 | 0 | 67 | 67 | 10 | Control Card |
|  | 6/1/95 | 0 | 0 | 0 | 0 | 35 | 0 | Power Supply |
|  | 6/10/95 | 1 | 0 | 0 | 0 | 48 | 0 | HDA |
|  | 8/7/95 | 0 | 0 | 30 | 90 | 90 | 10 | HDA |
|  | 11/20/95 | 0 | 0 | 0 | 0 | 15 | 0 | Microcode |
|  | 12/12/95 | 0 | 0 | 0 | 0 | 50 | 0 | HDA |
|  | 12/20/95 | 0 | 0 | 0 | 400 | 85 | 0 | HDA |
|  | 3/24/96 | 0 | 0 | 0 | 0 | 20 | 5 | Power Supply |
|  | 4/25/96 | 1 | 1 | 30 | 557 | 15 | 25 | Microcode |
| Total for Serial | | 1 | 1 | 30 | 557 | 425 | | |
| 9234916 | 6/5/95 | 0 | 0 | 0 | 0 | 35 | 1 | HDA |
|  | 7/25/95 | 0 | 0 | 0 | 0 | 45 | 0 | Power Supply |
|  | 10/31/95 | 0 | 0 | 0 | 0 | 10 | 0 | HDA |
|  | 1/9/96 | 0 | 0 | 0 | 30 | 30 | 0 | Control Card |
|  | 2/10/96 | 0 | 0 | 0 | 10 | 10 | 0 | HDA |
| Total for Serial | | 0 | 0 | 0 | 40 | 130 | 1 | |
| 9234918 | 4/13/95 | 0 | 0 | 0 | 0 | 38 | 0 | HDA |
|  | 5/11/95 | 0 | 0 | 0 | 17 | 100 | 5 | Microcode |
| Total for Model | | 20 | 18 | 210 | 976 | 2178 | 125 | |
| Total for Item | | 55 | 60 | 705 | 3107 | 5040 | 198 | |

ANALYSIS OF FAILURES IN A COMPUTING ENVIRONMENT

TECHNICAL FIELD OF THE INVENTION

This invention relates generally to the field of data analysis, and more specifically to the analysis of failures in a computing environment.

BACKGROUND OF THE INVENTION

Computing environments, which may comprise a vast array of hardware and software elements, tend to fail from time to time due to their complexity. Analyzing the failures in a computing environment can be important for many reasons.

Proper analysis can identify a cause of repeated failures in a computing environment, such as a hardware or software element which functions poorly. When the cause is identified, appropriate action, such as replacing the hardware or software element, can be taken so that failures attributable to that cause are eliminated or reduced.

In addition, failure analysis is also necessary for obtaining ISO certification of a computing environment. ISO certification, which is a certification of quality, assures clients of an entity operating the computing environment that the computing environment has met certain stringent standards. The entity may be able to develop more business on the basis of the ISO certification.

Although prior systems were developed to track failures in computing environments, these systems did not maintain all of the information necessary to analyze patterns in repeated failures or isolate root causes and facilitate preventative actions.

SUMMARY OF THE INVENTION

In accordance with the present invention, the disadvantages and problems associated with analyzing failures in computing environments have been substantially reduced or eliminated.

In accordance with one embodiment of the present invention, an automated method for analyzing failures arising in computing environments includes storing information relating to at least one prior failure in a computing environment. Afterwards, information relating to a current failure in the same computing environment or another computing environment is received. The received information relating to the current failure is compared with the stored information relating to the prior failure in order to find similarities. A user is instructed to take an appropriate action in response to similarities between the current failure and the prior failure. In this manner, failures arising in the computing environments are analyzed.

In accordance with another embodiment of the present invention, a system is provided for analyzing failures arising in in computing environments. The system includes an interface which receives information relating to a current failure in a computing environment. A database stores information relating to at least one prior failure in the same computing environment or another computing environment. A processor, which is coupled to the interface and the database, compares the received information relating to the current failure with the stored information relating to the prior failure in order to find similarities. The processor may then instruct a user to take appropriate action in response to similarities between the current failure and the prior failure, thereby analyzing the failures.

Important technical advantages of the present invention include maintaining a record of the specific hardware or software elements which have caused various failures in one or more computing environments. For each failure, information is received to identify the specific element causing the failure according to a plurality of different parameters, including serial number, model number or version, class or item, and vendor. This failure information can then be used to pinpoint or determine a recurring cause for failure in the computing environments, whether the cause is a specific part of an element, a specific element, a specific model or version, a specific item or class, or the products supplied by a specific vendor.

Another important technical advantage of the present invention includes providing an interface which requires minimal keying by an operator to input failure information. This is accomplished by maintaining an inventory record of hardware and software elements in a computing environment. For each element, inventory information is maintained which specifies the different parts in the element, the serial number of the element, the model number or version of the element, the item or class of the element, and the vendor supplying the element. The inventory information may drive a graphical interface so that a human operator does not have to type in this information when reporting a failure caused by the element. Thus, the errors attributable to a human operator typing in incorrect information are substantially reduced or eliminated.

Another important technical advantage of the present invention includes generating analytical information about failures which can be used for a variety of purposes. The analytical information may specify all of the failures that are attributable to a particular element, model or version, item or class of products, or vendor. This analytical information can be submitted as part of the process for obtaining or maintaining ISO certification. Furthermore, the analytical information can be used to formulate or alter purchasing patterns. For example, if the products supplied by a particular vendor cause a disproportionately large number of failures, that vendor should not be included on a list of approved suppliers. In addition, because the information may identify specific parts of elements which fail, the information can be used by vendors as part of the vendors' quality management programs.

Other important technical advantages are readily apparent to one skilled in the art from the following figures, descriptions, and claims.

BRIEF DESCRIPTION OF THE DRAWINGS

For a more complete understanding of the present invention and for further features and advantages, reference is now made to the following description taken in conjunction with the accompanying drawings, in which:

FIG. 3 illustrates an exemplary screen generated by the system shown in FIG. 1;

FIG. 4 illustrates an exemplary failure report table generated by the system shown in FIG. 1;

DETAILED DESCRIPTION OF THE INVENTION

The preferred embodiment of the present invention and its advantages are best understood by referring to FIGS. 1–7 of the drawings, like numerals used for like and corresponding parts of the various drawings.

Figure 1:
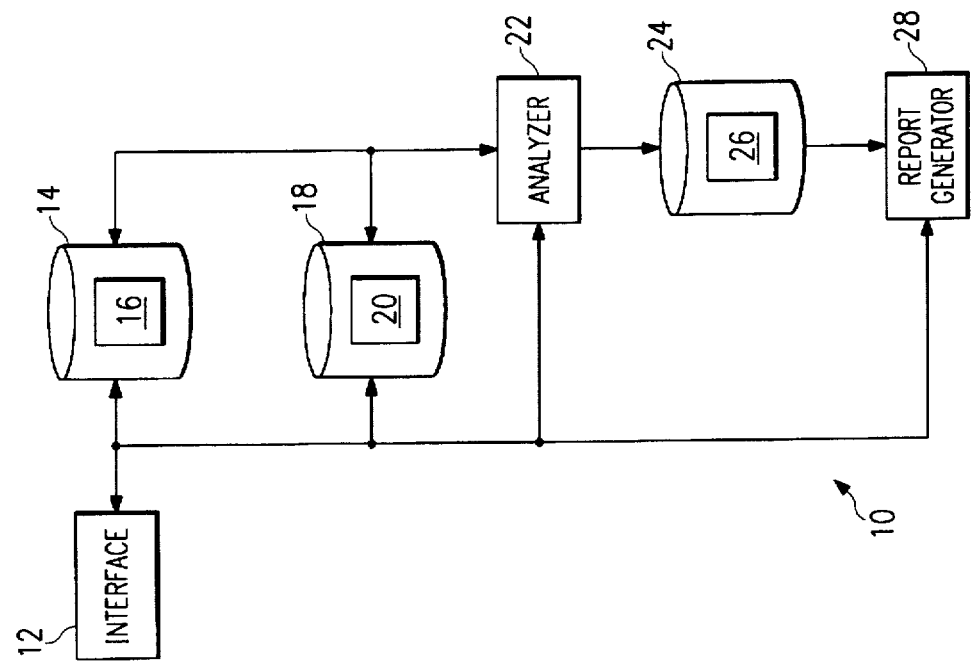
FIG. 1 illustrates a system for analyzing failures arising in one or more computing environments, according to an embodiment of the present invention.

FIG. 1 illustrates a system 10 for analyzing failures arising in one or more computing environments. System 10 includes an interface 12 which can receive information from a user, or alternatively, from other systems, such as, for example, a financial and asset management system. This information may include inventory information 16 and failure information 20, both of which are described below in more detail.

An inventory information memory 14, which is coupled to interface 12, stores inventory information 16 received by system 10. Inventory information memory 14 can reside in a suitable storage medium, such as RAM, ROM, disk, tape storage, or other suitable volatile or non-volatile data storage system. Inventory information memory 14 may be a relational database.

Inventory information 16 preferably identifies the various elements from which one or more computing environments are made. Each element can be a particular hardware or software component or any other suitable component, such as a specific disk drive, work station, modem, file server, multiplexer, private branch exchange (PBX), circuit pack, or software application running on a particular processor. For each element, inventory information 16 can specify the provider, such as a manufacturer or vendor, supplying and/or servicing the element, the item or class of the element, the model number or version of the element, the serial number of the element, and the various parts making up the element. For example, inventory information 16 for a disk drive may specify that ABC Corporation is the vendor supplying the disk drive, the item is a disk drive, the model number of the disk drive is a MDD357, the serial number of the disk drive is 83823482, and the parts of the disk drive include a power converter, a drive mechanism, and a read/write device. Inventory information 16 for an accounting software program may specify that DEF Company is the supplying vendor, the item is an accounting program, the version of the program is 4.1, and the program is being operated on a work station at computing site 12. Inventory information memory 14 may maintain inventory information 16 in a variety of configurations, such as by computing environment, by vendor, by model or version, or by any other configuration that facilitates use or analysis of the inventory information 14. Inventory information 16 can be tied to the accounting or capitalization records of an entity operating system 10, thereby assuring that inventory information 16 is current.

A failure information memory 18 is also coupled to interface 12. Like inventory information memory 14, failure information memory 18 can reside in a suitable storage medium, such as RAM, ROM, disk, tape storage, or other suitable volatile or non-volatile data storage system. Failure information memory 18, which may be a relational database, receives and stores failure information 20.

Failure information 20 includes information relating to one or more failures in the computing environments defined by inventory information 16. Failure information 20 can specify the computing environment or site of a failure, the date of the failure, the time and duration of the failure, the impact of the failure, and any other information useful in analyzing a particular failure. Because each failure may be attributable to one or more of the various elements specified in the inventory information 16, failure information 20 may also comprise information similar to the inventory information, such as the part of an element which failed, the serial number of the element, the model number of version of the element, the item or class of the element, and the vendor supplying the element.

In one embodiment, interface 12 may use inventory information 16 stored in inventory information memory 14 to prompt a user of system 10 to input failure information 20. For example, interface 12 may comprise a graphical user interface (GUI), such as a WINDOWS™-type display, which allows a user of system 10 to input failure information 20. The GUI interface can include a plurality of input windows and pull-down boxes which are driven by inventory information 16, thereby minimizing the amount of typing required by a human operator to input failure information. Thus, the errors attributable to a human operator typing in incorrect information are substantially reduced or eliminated. An exemplary input screen presented by interface 12 for collecting failure information 20 is illustrated in FIG. 3.

An analyzer 22 is coupled to interface 12, inventory information memory 14, and failure information memory 18. The functionality of analyzer 22 may be performed by a processor, such as a main-frame, file server, work station, or any other suitable data processing facility. Analyzer 22 retrieves inventory information 16 and failure information 20 from the respective memories. Using this information, analyzer 22 functions to analyze the failures in one or more of the computing environments to generate analysis information 26. In particular, analyzer 22 may determine the number of failures which are attributable to a specific part of a particular element, a specific element, or a specific grouping of elements, including by model or version, by item or class, or by supplying vendor. Also, analyzer 22 can function to determine whether the number of failures attributable to a particular element or grouping of elements has exceeded a predetermined limit, such limit preferably being configurable by a user of system 10. In this manner, system 10 is able to identify elements that cause an unacceptable number of failures.

Furthermore, analyzer 22 may recommend various actions to the user after performing the failure analysis. For example, if analyzer 22 determines that the number of failures attributable to a particular element has exceeded a predetermined limit for that element, analyzer 22 may recommend that the element be replaced. Likewise, if analyzer 22 determines that the number of failures attributable to products supplied by a particular vendor has exceeded a predetermined limit, analyzer 22 may recommend that no additional products be purchased from that vendor.

An analysis information memory 24, coupled to analyzer 22, stores the analysis information 26 generated by the analyzer. Like inventory information memory 14 and failure information memory 18, analysis information memory 24 may reside in a suitable storage medium, such as RAM, ROM, disk, tape storage, or other suitable volatile or non-volatile data storage system. Analysis information memory 24 can also be a relational database.

A report generator 28 is coupled to analysis information memory 24 and interface 12. Like analyzer 22, the functionality of report generator 28 may be performed by a processor, such as a main-frame, file server, work station, or any other suitable data processing facility. In response to queries received from a user of system 10, report generator 28 generates one or more reports comprising words, tables, or graphs created from analysis information 26 received from analysis information memory 24. These analysis reports can be presented to the user in the form of one or more screens displayed on a computing monitor, print copy, or any other suitable media. The reports generated by report generator 28 can be used for a variety of purposes. For example, these reports can identify which particular part of an element may be the cause for a large number of failures in a computing environment. Also, the reports can identify what specific element, model or version of element, item or class of elements, or vendor has contributed significantly to failures in one or more computing environments. Furthermore, the reports can qualify the impact of various failures, either individually or collectively, upon an entity maintaining a computing environment.

Figure 2:
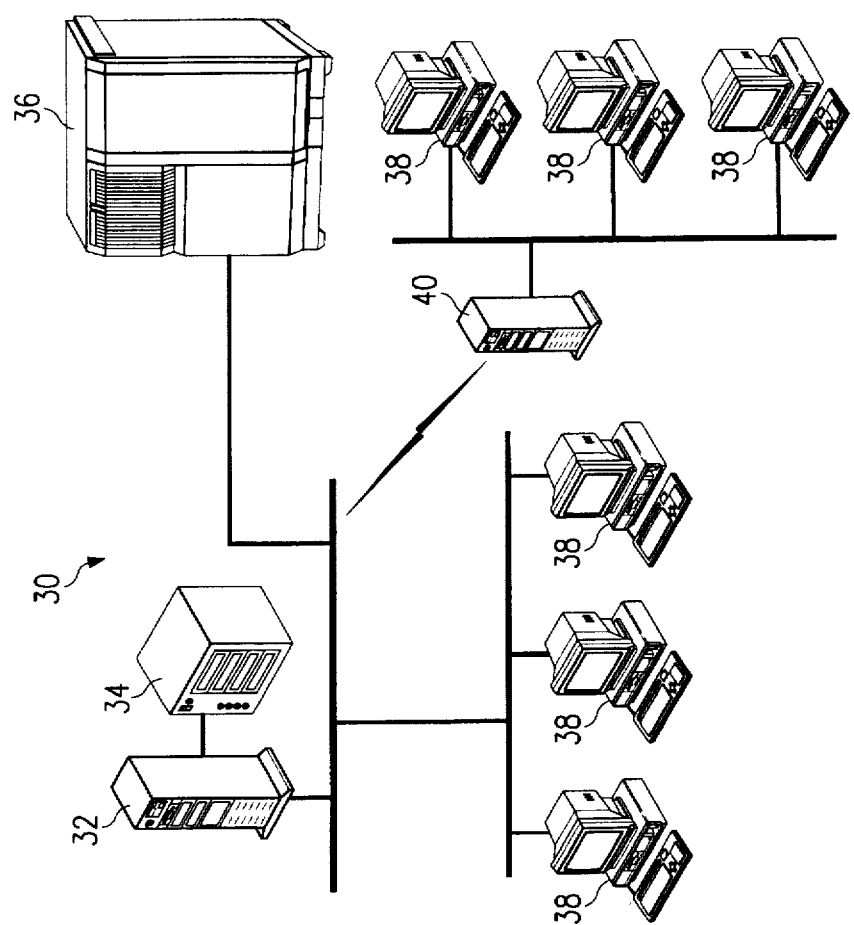
FIG. 2 illustrates an exemplary computer-based system that can be used to implement the analytical system shown in FIG. 1.

FIG. 2 is a simplified diagram of an exemplary computer-based system 30 that can be used to implement the analytical system 10 shown in FIG. 1. Referring to the embodiment shown in FIG. 2, computer-based system 30 can include a process server 32, a data storage device 34, a main-frame computer 36, a plurality of work stations or desktop computers 38, and a local file server 40.

Process server 32 preferably functions to process inventory information 16, failure information 20, and command information received by system 10. A SUN SOLARIS 2.3 System has been successfully utilized as a process server 32. Data storage device 34 can be a mass storage subsystem of tapes and/or disk drives, which is electronically coupled to process server 32. In one embodiment, a relational database resides in data storage device 34. Consequently, process server 32 may retrieve, process and store the information in the relational database residing in data storage device 34.

Main-frame computer 36 may be linked electronically to process server 32 through a local area network (LAN) or wide area network (WAN), for automated uploading and downloading of information therebetween. Any general purpose or medium-sized computer, which includes a central processing unit (CPU) and suitable RAM, ROM, and I/O circuitry can be utilized for main-frame computer 36.

At least one work station 38 can be coupled to process server 32 by the same or a different LAN or WAN connecting main-frame computer 36. A user of system 10 may input and receive inventory information, failure information, analysis information, and report information through any of work stations 38. Preferably, each work station 38 is a desktop computer having at least a 486 processor or an operational equivalent. Systems programming for system 10 may be performed on a work station 38 by using a high level programming language, such as C++.

Local file server 40 may be linked electronically to process server 32 by the same or a different LAN or WAN, or by telecommunication lines through a modem (not specifically shown). Additionally, as shown (for illustrative purposes only) in FIG. 2, process server 32 can be linked by a "gateway" interface communications processor to local file server 40. Local file server 40 is preferably connected to a second plurality of work stations 38, which provide the same functionality as the first plurality of work stations 38 previously described.

The present invention contemplates that a user of system 10 can be any entity which desires to collect, maintain, and analyze failure information for one or more computing environments operated by the entity. Because the different computing environments can be situated throughout the world, failure information for any specific computing environment can be collected at the site of the computing environment via a suitable work station 38. The failure information can then be relayed to a centralized location, such as process server 32, data storage device 34, or main-frame computer 36, for storage and analysis.

Inventory information memory 14, failure information memory 18, and analysis information memory 24 shown in FIG. 1 can be stored in the relational database residing in data storage device 34. Process server 32, main-frame computer 36, work stations 38, and local file server 40 are preferably linked together. Consequently, each of these devices can directly access (e.g., store and retrieve) the information, if necessary.

FIG. 3 is an exemplary failure information screen 42 that may be presented by system 10 to collect or display information relating to a particular failure in a computing environment. This failure information may be collected automatically by system 10 or a user of system 10 can input the information using the input features of screen 42, as described below. Failure information screen 42 may comprise a plurality of input or display sections, including an inventory information section 44, a trouble ticket section 46, a cause of failure section 48, a time section 50, a notes section 52, and an action key section 54.

Inventory information section 44 may comprise a plurality of boxes, such as a complex box 56, a vendor box 58, an item box 60, a model number box 62, and a serial number box 64, in which information can be displayed or entered to identify an element causing the failure. In one embodiment, each of these boxes 56 through 64 may comprise a pull-down box driven by inventory information 16. Each pull-down box presents a user of system 10 with a list of items from which the user can select to identify the failing element. For example, when activated, vendor box 58 provides a list of all vendors supplying one or more products used in the computing environments. In addition, the boxes 56 through 64 can be relationally linked according to inventory information 16. As described above, inventory information 16 may specify each element contained in a computing environment by serial number, model number or version, item or class, and supplying vendor. Thus, for example, if a user selects a particular site of a computing environment in complex box 56, only the vendors, items or classes, models or versions, and serial numbers of the elements associated with that computing environment (as defined by inventory information 16) will be available for selection in the other boxes 58 through 64.

Trouble ticket section 46 includes a number of boxes into which information can be displayed or entered by either pull-down or keying. These boxes include a date box 66, a trouble ticket no. box 68, a defective part box 70, an unscheduled initial program load (IPL) box 72, and a loss of data box 74. The date of the failure can be entered or displayed in date box 66. Date box 66 may default to the current date when failure information screen 42 is generated. A specific trouble ticket number associated with the failure can be displayed or entered into trouble ticket no. box 68, for example, by typing. Alternatively, the trouble ticket number may be automatically generated and assigned to the failure as the other information is entered, thereby facilitating tracking of the failure. Defective part box 70 can be a pull-down box for the various parts which make up the element identified in inventory information section 44.

Unscheduled IPL box 72 and loss of data box 74 display or receive information specifying the impact (i.e., how critical the failure may be), as described below in more detail. These boxes 72 and 74 may require that information be input in a binary format—i.e., either a "1" or a "0." If information is input in any other format, failure information screen 42 may inform the user that binary format is required.

Cause of failure section 48 comprises a plurality of boxes, such as a vendor hardware box 76, a vendor software box 78, and a non-vendor box 80, which are used to identify whether the failure is attributable to a product provided by a vendor or, alternatively, unrelated to any such product. For example, if the failure is caused by a fire which destroys a complex in which a computing environment is contained, such failure is nonvendor related. Like unscheduled IPL box 72 and loss of data box 74, each of boxes 76 through 80 may require input in binary format. If information is input in a non-binary format, failure information screen 42 may inform the user that binary format is required.

Time section 50 comprises a number of boxes into which various times relating to the failure can be displayed to or entered by a user of system 10. These boxes include a device down time box 82, an interactive system (IS) down time box 84, a vendor response time box 86, and a repair time box 88. Like unscheduled IPL box 72 and loss of data box 74, at least some of these boxes in time section 50 may specify the impact of the particular failure.

Notes section 52 can be used to display or input notes or comments relating to the failure. For example, additional details about the failure can be entered or displayed to further describe the cause of failure, the impact of the failure, or any other suitable noteworthy comment.

Action key section 54 comprises a number of keys, including insert record key 92, clear screen key 94, and exit key 96.

Figure 5A:
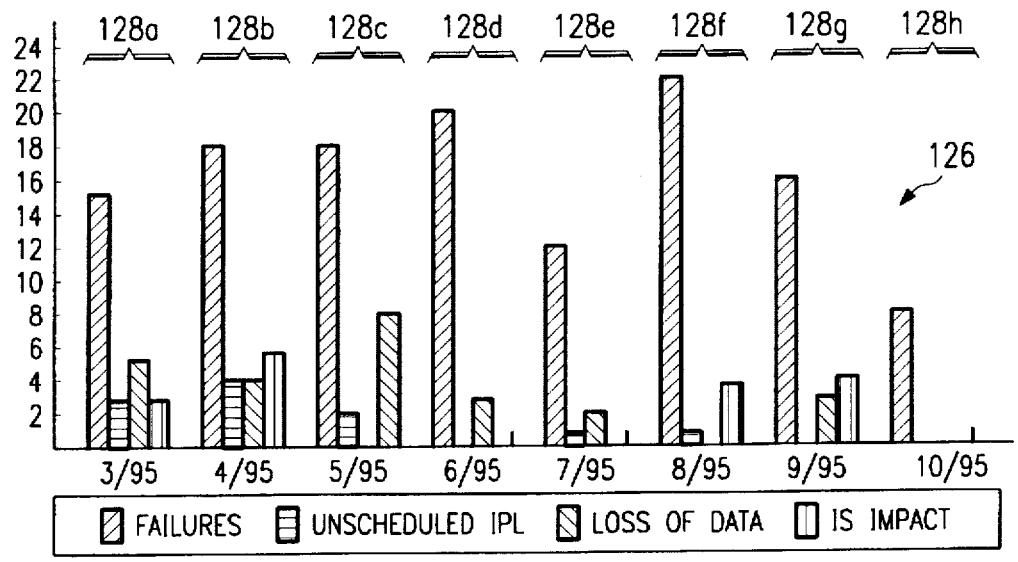
FIGS. 5A and 5B illustrate exemplary failure report graphs generated by the system shown in FIG. 1.
Figure 5B:
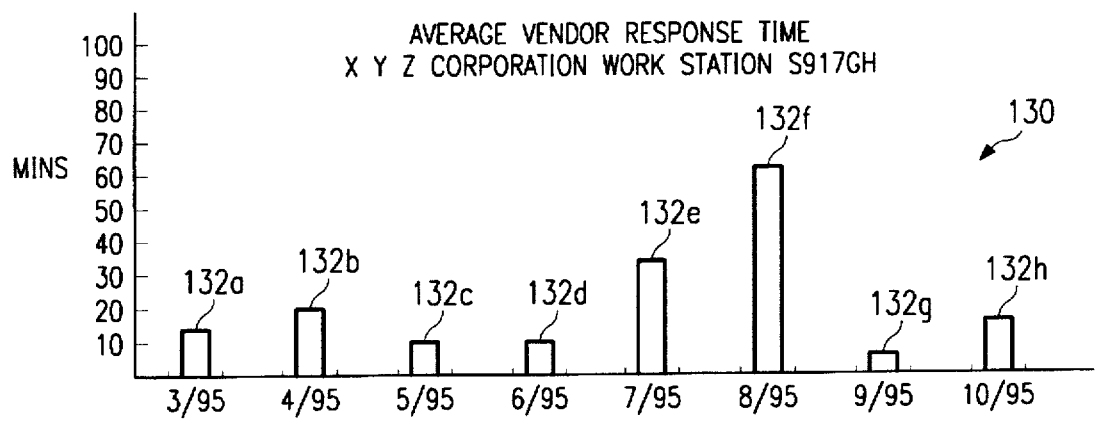

FIGS. 4, 5A, and 5B illustrate exemplary failure reports that may be generated by system 10 after receiving and analyzing information relating to one or more failures. It must be understood that system 10 may generate failure reports according to various parameters, such as time period, computing environment, vendor, item or class, model or version, element, or any other suitable parameter, in any of a variety of formats, such as a table, a graph, or any other suitable format for conveying information. In one embodiment, the parameters and format for any particular failure report can be defined by user of system 10 as desired to view specific analysis information.

FIG. 4 illustrates an exemplary failure report table 98 that is specific to a particular item of product, vendor, and time period. In particular, failure report table 98 comprises failure information for the time period of Apr. 3, 1995 to May 1, 1996, relating to work stations supplied by XYZ Corporation.

Failure report table 98 includes a plurality of columns 100 through 116. A serial number column 100 specifies one or more elements by their corresponding serial numbers, which, as shown, include serial numbers 9234915, 9234916, and 9234918. A date column 102 specifies the dates of failures caused by each element within the time period of failure report table 98. An unscheduled IPL column 104 specifies whether an IPL or power down for the computing environment was required at the time of failure. A loss of data column 106 specifies whether any data was lost at the time of failure. An IS down time column 108 may specify the down time for the computing environment attributable to the failure. A device down time column 110 specifies down time for the element attributable to the failure. A repair time column 112 specifies the time required to repair the computing environment. A vendor response time column 114 specifies how long a vendor supplying the failing element took to respond to a request for assistance after the failure was identified. A part column 116 specifies which part of an element was the cause of the failure.

Failure report table 98 may also include a plurality of rows providing a summary or total for the information specified in columns 104 through 114 according to various parameters. Serial number total rows 118 and 120 specify totals for the elements corresponding to serial numbers 9234915 and 9234916, respectively. Model total row 122 specifies totals for model S917GH in failure report table 98. Item total row 124 specifies totals for the work station identified in failure report table 98.

Failure report table 98 provides failure and analysis information that can be readily used by an entity operating system 10 to determine causes of failure, specific parts to which failures are attributable, and other similar information. Furthermore, failure report table 98 provides failure impact information specifying how critical any particular failure may have been. For example, a failure which causes an unscheduled initial program load or a loss of data is especially severe. Likewise, failures causing relatively lengthy IS or device downtimes are critical.

The information provided in failure report table 98 may be useful for a variety of reasons. For example, the entity maintaining a computing environment may alter its buying habits in response to the information displayed in a failure report table. If the information specifies that a particular model or item of product is responsible for a large number of failures, then that model or item can be dropped from the entity's list of approved products. Likewise, if the products supplied by a particular vendor are responsible for a large number of failures, then that vendor may be dropped from the entity's list of approved vendors, or the contract with the vendor can be renegotiated on terms more favorable to the entity. In addition, the entity may compare the statistics for actual failures in failure report table 98 against statistics provided by manufacturers or vendors, thereby empirically testing such vendor-supplied statistics, such as, for example, mean time between failure (MTBF) and mean time to repair (MTTR). Furthermore, vendors can use the information in their own quality management programs. For example, different vendors may use similar parts supplied by the same subvendor. If such sub-vendor-supplied parts cause failures in the products of multiple vendors, each vendor can be informed accordingly. Also, the analytical information can be submitted as part of the process to obtain or maintain ISO certification.

FIGS. 5A and 5B illustrate exemplary failure report graphs that may be generated by system 10. Referring to FIG. 5A, a device failure and impact report graph 126 graphically illustrates the impact of failures attributable to work station model 917GH supplied by vendor XYZ Corporation. Device failure and impact report graph 126 comprises a plurality of evaluation bar sets 128a through 128h associated with various time periods of reporting. As shown, these reporting periods correspond to separate months, for the months of March 1995 through October 1995. However, it should be understood that the reporting periods can be configured in any other suitable manner, such as by day, by week, by quarter, or by year. Each of evaluation bar sets 128a through 128h may comprise a separate bar to illustrate the number of failures, the number of unscheduled initial program loads, the number of incidents of data loss, and number of interactive system impacts in the corresponding month. The graphical information shown in device failure and impact report graph 126 can be generated from the same information shown in failure report table 98 of FIG. 4.

FIG. 5B illustrates an exemplary average vendor response time report graph 130 for work station model 917GH supplied by vendor XYZ Corporation. Like device failure and impact report graph 126 shown in FIG. 5A, average vendor response time report graph 130 may comprise information broken out according to separate time periods, such as by day, by week, by month, by quarter, or by year. As shown in FIG. 5B, reporting periods are by month for each of the months from March 1995 through October 1995. Average vendor response time report graph 130 comprises evaluation bars 132a through 132h. Each of evaluation bars 132a through 132h specify an average time in minutes which was required by vendor XYZ Corporation to respond to failures in the corresponding month.

Figure 6:
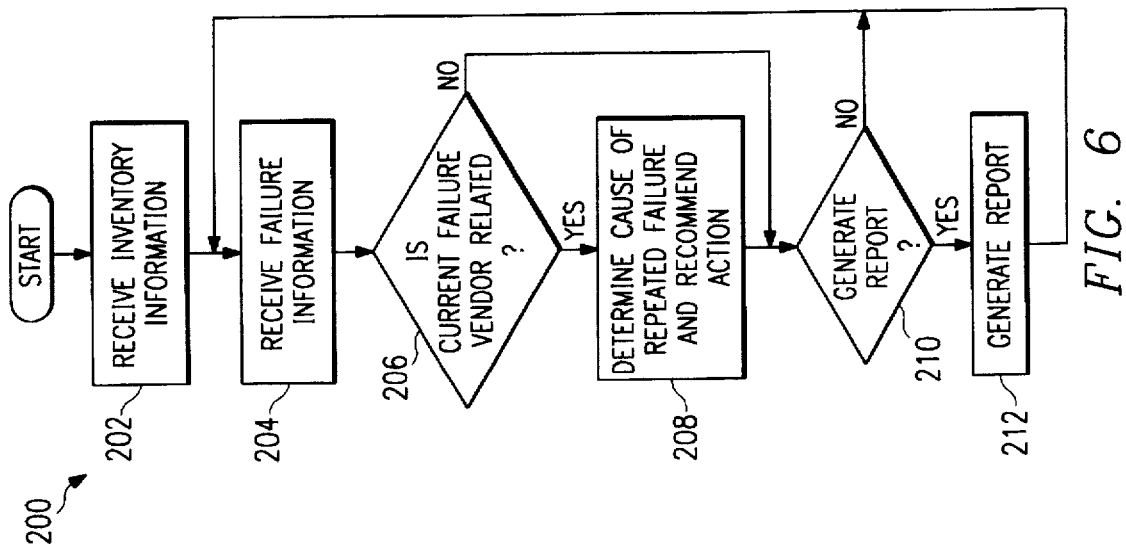
FIG. 6 is a flow chart of a method for analyzing failures arising in one or more computing environments, according to an embodiment of the present invention.

FIG. 6 is a flowchart illustrating one embodiment of a method 200 for analyzing failures arising in one or more computing environments. Method 200 begins at step 202 where system 10, via interface 12, receives inventory information 16. In one embodiment, system 10 prompts a user of the system to input various information identifying all of the elements in one or more computing systems. Alternatively, inventory information 16 can be received from another system (e.g., a financial and asset management system), the exchange of information preferably being driven by a receipt acknowledgment process. For each element, inventory information 16 includes information specifying the parts making up the element, the serial number of the element, the model of the element, the item or class of the element, and the vendor supplying the element. The inventory information 16 can be stored in inventory information memory 14.

If the computing environment includes more than one of the same element, system 10 can be configured so that all information except the serial number of the element need only be entered once into system 10 at receipt and acknowledgment (i.e., when the information is initially received and acknowledged). Consequently, entry of inventory information 16 is facilitated. For example, if a computing environment includes three work stations of a particular model, the vendor information, the item information, the model information and the parts information is entered once for the first work station along with the first work station's serial number. Afterwards, the serial numbers of the other two work stations can be entered and the other information copied from a profile of the first work station.

System 10 receives failure information 20 via interface 12 at step 204. Failure information 20 includes detailed information about one or more failures in at least one computing environment. For each failure, failure information 20 may include information specifying the element causing the failure, the time and the date of failure, the duration of the failure, and the impact of the failure. As previously described with reference to failure information screen 42 shown in FIG. 3, inventory information 16 can be used to drive the entry of failure information 20 so that a particular element can be identified as causing the failure, if appropriate.

In one embodiment, failure information 20 is accumulated as the failures occur. Thus, all failure information 20 relates to a current failure at the time the information is received. Whenever new failure information is input into system 10, the failure information already contained in system 10 can be considered as relating to prior failures. Failure information 20 can be stored in failure information memory 18.

Analyzer 22 retrieves information from failure information memory 18 and inventory information memory 14. At step 206, analyzer 22 determines whether the current failure is related to an element supplied by a vendor. System 10 distinguishes between vendor-related failures and failures that are not attributable to any products supplied by a vendor. Consequently, all failures that may be caused by something other than an element in the computing system will not be considered during analysis of vendor-related failures.

If the current failure is vendor-related, analyzer 22 analyzes the failure and recommends appropriate action at step 208. The process by which system 10 analyzes failures and recommends action is described below in more detail with referenced to FIG. 7. The analysis information 26 generated by analyzer 22 can be stored in analysis information memory 24.

At step 210, system 10 queries a user whether a report should be generated. If a report should be generated, report generator 28 retrieves analysis information and generates a failure report, such as failure report table 98 or failure report graphs 126 and 130, at step 212. The failure report may outline various details of the failures in one or more computing systems according to the analysis performed by analyzer 22. The parameters for the report can be customized by the user so that the analysis information is presented in a desirable format that facilitates understanding. System 10 then returns to step 204 where failure information 20 for another failure is received.

System 10 repeats steps 204 through 212 to continuously monitor and receive failure information 20 for analysis so that reports reflecting the most current information can be generated as needed.

Figure 7:
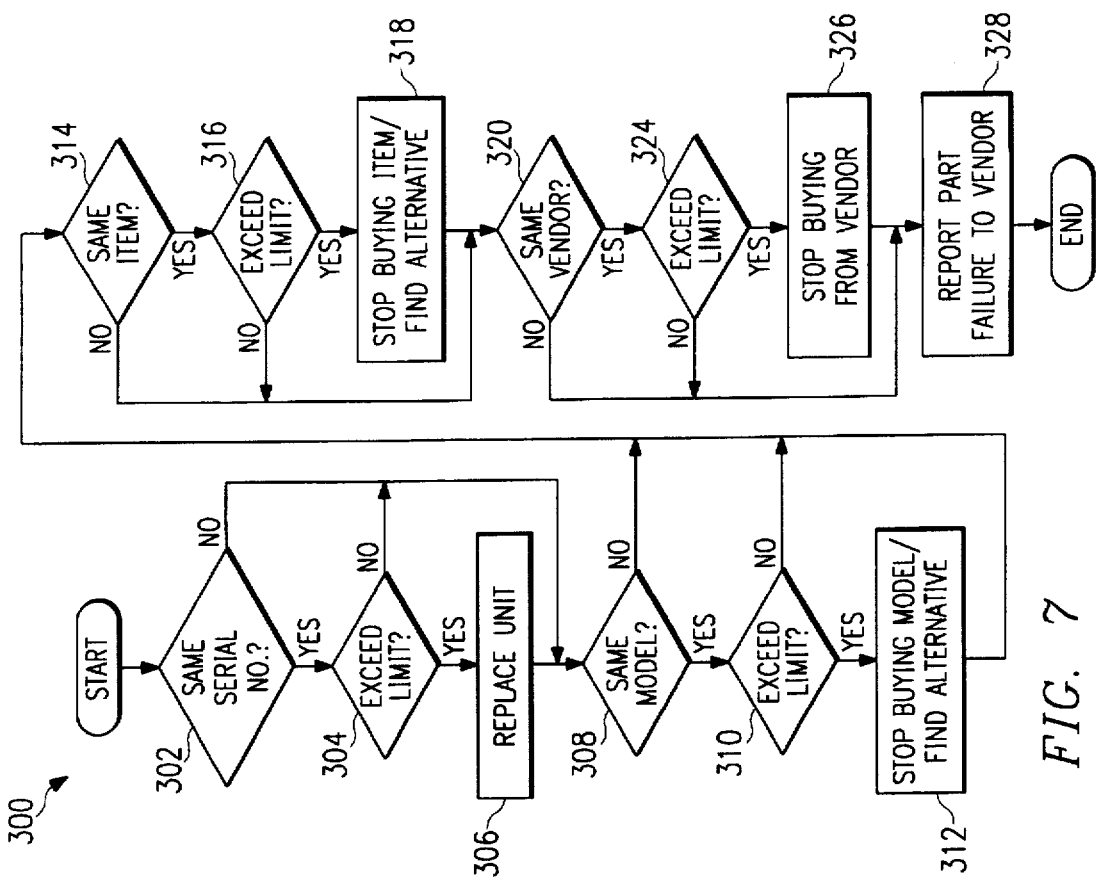
FIG. 7 is a flow chart of a method for determining a cause of repeated failure in one or more computing environments and recommending an action in response.

FIG. 7 is a flowchart of a method 300, corresponding to step 208 in FIG. 6, by which system 10 determines a cause of repeated failure and recommends appropriate action in response. Method 300 begins at step 302 where analyzer 22 determines whether the serial number for an element causing the current failure is the same as the serial number of any element which caused a prior failure. In this way, system 10 is able to identify an element which is responsible for repeated failure in a computing system.

If the serial number is the same, then at step 304, analyzer 22 determines whether the number of failures attributable to the element has exceeded a predetermined limit. If the number of failures exceeds the limit, system 10 recommends that the unit or element be replaced at step 306. Because the acceptable number of failures attributable to a specific element is not the same for all elements, the predetermined limit for each element may be configurable by a user of system 10. Consequently, an element will only be replaced if it causes an unacceptable number of failures.

At step 308, analyzer 22 determines whether the model of the element causing the current failure is the same as any model which caused a prior failure. Thus, models which are responsible for repeated failures in a computing environment can be identified. If the model is the same, at step 310, analyzer 22 determines whether the number of failures attributable to the model has exceeded a predetermined limit, which preferably is configurable. If so, at step 312, system 10 recommends that such a model not be purchased in the future and an alternative for the model be found.

At step 314, analyzer 22 determines whether the item or class of the element causing the current failure is the same as any item or class of an element causing a prior failure. Consequently, system 10 can identify items or classes of products which have caused repeated failures in a computing environment. If the item or class is the same, at step 316, analyzer 22 determines whether the number of failures attributable to the item or class has exceeded a configurable, predetermined limit. If so, system 10 recommends that the item not be purchased in the future and an alternative for the item be found at step 318.

Analyzer 22 determines whether the vendor supplying an element causing the current failure is the same as any vendor supplying an element which caused a prior failure at step 320. In this way, vendors which have provided products causing repeated failure in a computing environment can be identified. If the vendor is the same, at step 324, analyzer 22 determines whether the number of failures associated with the vendor has exceeded a predetermined limit, such limit preferably being configurable by a user. If so, at step 326, system 10 recommends that no products be purchased from that vendor in the future.

At step 328, system 10 instructs a user to report the part failure to the vendor associated with the element causing the failure.

Although the present invention and its advantages have been described in detail, it should be understood that various changes, substitutions, and alterations can be made therein without departing from the spirit and scope of the invention as defined by the appended claims.

What is claimed is:

1. An automated method for analyzing failures arising in computing environments, comprising the steps of:
   storing prior failure information relating to at least one prior failure in a computing environment, the prior failure information specifying details for an element which caused the at least one prior failure;
   storing inventory information relating to a plurality of elements in the computing environment, the inventory information specifying for each element a provider associated with that element;
   receiving current failure information relating to a current failure in the same computing environment or another computing environment, the current failure information specifying details for an element which caused the current failure;
   determining whether the provider associated with the element which caused the current failure is the same as the provider associated with the element which caused the at least one prior failure using the prior failure information, the inventory information, and the current failure information; and
   instructing a user to take an appropriate action with respect to the provider associated with the element which caused the current failure.

2. The method of claim 1, further comprising the step of determining whether the element which caused the current failure is the same as the element which caused the at least one prior failure.

3. The method of claim 1, further comprising the step of alerting a user to similarities between the element which caused the current failure and the element which caused the at least one prior failure.

4. The method of claim 1, further comprising the step of receiving the inventory information.

5. The method of claim 1, wherein the step of receiving current failure information further comprises the step of generating a graphical user interface driven by the stored inventory information.

6. The method of claim 1, further comprising the step of generating a failure report on the current failure and the at least one prior failure.

7. The method of claim 6, wherein the step of generating a failure report comprises the step of receiving parameters for the failure report from a user.

8. The method of claim 1, wherein the step of determining further comprises the step of comparing a serial number of the element which caused the current failure against a serial number of any element as specified in the inventory information.

9. The method of claim 1, wherein the step of determining further comprises the step of comparing a model number of the element which caused the current failure against a model number of any element as specified in the inventory information.

10. The method of claim 1, wherein the provider comprises a vendor.

11. A system for analyzing failures arising in computing environments, comprising:
   a database operable to store prior failure information and inventory information, the prior failure information relating to at least one prior failure in a computing environment and specifying details for an element which caused the at least one prior failure, the inventory information relating to a plurality of elements in the computing environment and specifying for each element a provider associated with that element;
   an interface operable to receive current failure information relating to a current failure in the same computing environment or another a computing environment, the current failure information specifying details for an element which caused the current failure: and
   a processor coupled to the interface and the database, the processor operable to determine whether the provider associated with the element which caused the current failure is the same as the provider associated with the element which caused the at least one prior failure using the prior failure information, the inventory information, and the current failure information, the processor further operable to instruct a user to take appropriate action with respect to the provider associated with the element which caused the current failure.

12. The system of claim 11, wherein the processor is further operable to generate a failure report on the current failure and the at least one prior failure.

13. The system of claim 12, wherein the processor is further operable to generate the failure report in response to parameters received from a user.

14. The system of claim 11, further comprising a display coupled to the processor.

15. The system of claim 11, wherein the database is further operable to store the inventory information.

16. The system of claim 11, wherein the interface further comprises a graphical user interface.

17. The system of claim 11, wherein the provider comprises a vendor.

* * * * *